United States Patent [19]

Dehen

[11] 4,347,752
[45] Sep. 7, 1982

[54] APPARATUS FOR CONVERTING ROTARY MOTION TO A RECTILINEAR FORCE

[76] Inventor: Frederick L. Dehen, P.O. Box 11278, Houston, Tex. 77016

[21] Appl. No.: 178,836

[22] Filed: Aug. 18, 1980

[51] Int. Cl.³ .................... F16H 21/14; F16H 35/02
[52] U.S. Cl. ........................... 74/84 R; 74/61; 74/69; 74/84 S; 74/117; 74/393
[58] Field of Search ............... 74/61, 69, 84 R, 84 S, 74/117, 393

[56] References Cited

U.S. PATENT DOCUMENTS

| | | | |
|---|---|---|---|
| 1,115,000 | 10/1914 | Martin | 74/69 |
| 1,210,989 | 1/1917 | Roth | 74/87 X |
| 2,088,115 | 7/1937 | Neff | 74/84 S |

FOREIGN PATENT DOCUMENTS

| | | | |
|---|---|---|---|
| 2332439 | 7/1977 | France | 74/84 S |
| 2432627 | 4/1980 | France | 74/84 R |

Primary Examiner—Allan D. Herrmann
Attorney, Agent, or Firm—Chernoff & Vilhauer

[57] ABSTRACT

Apparatus for converting rotary motion from a source of power which may be of constant speed into a rectilinear force includes a coupling arrangement for driving an eccentrically unbalanced flywheel at a cyclically varying rotational speed and linkages for altering the timing of the cyclical variation of speed of the eccentrically unbalanced flywheel. The apparatus comprises a cam element which is driven at a constant rate of speed about an output axis which is perpendicular to its face. The cam element has a slot extending diametrically across its face, configured for slidably engaging a pin which is located on a cam follower. The cam follower is freely rotatable about an input axis that is offset from the output axis by an amount which allows the pin to remain in the slot when the elements are rotated. The cam follower in turn drives the flywheel at a cyclically varying rotational speed.

9 Claims, 6 Drawing Figures

APPARATUS FOR CONVERTING ROTARY MOTION TO A RECTILINEAR FORCE

BACKGROUND OF THE INVENTION

The present invention relates to a device for converting rotary motion to a rectilinear force.

Eccentrically unbalanced rotating devices have been used in the past to impact rectilinear movement to an object. However, the prior art devices of this type have used an external restraint to bias the effect of the unbalanced force to generate movement in a particular direction rather than biasing the force itself. Typical of these devices is Dull, U.S. Pat. No. 2,639,777, where the biasing force is friction created by the wheels of a car.

As a result the prior art devices of this class are necessarily limited to an environment where restraining means can be applied to prevent movement in all but the desired direction. This limitation is undesirable in many applications, however, it is most noticeable in a free space application.

In addition the prior art devices are very inefficient as much of the energy generated is dissipated to the restraint.

SUMMARY OF THE INVENTION

The present invention provides a method for converting the energy of a rotating power source by using it to drive an eccentrically unbalanced flywheel at a cyclically varying rate of speed, thereby generating a rectilinear force.

The apparatus used for accomplishing this method comprises a cam element which is attached to the power source for rotation at a constant rate of speed about an output axis, with the face of the cam element being oriented perpendicular to the output axis and containing a diametric slot. A cam follower, having an inwardly extending pin arranged for engagement with the slot is rotatably mounted opposite the cam element on an input axis which is parallel with but offset from the output axis. Accordingly, as the cam element and follower are rotated, the pin is cyclically moved radially inwardly and outwardly in the slot between portions having respectively lower and higher surface speeds, and thus the rotational speed of the cam follower correspondingly varies.

Since the unbalance force created by the eccentrically weighted flywheel is proportional to its rotational speed, the unbalance force is greater over that portion of the rotational cycle having the higher rotational speed. As a result a force unbalance is created which is biased toward the higher speed portion of the flywheel, and by changing the angular relationship of the input axis with respect to the output axis, the direction of this bias can be changed as desired.

In one embodiment of the invention, four of the apparatus are mounted on a common platform with two of them having their flywheels rotating in opposite directions about a first axis and two of them having their flywheels rotating in opposite directions about a second axis which is perpendicular to and coplaner with the first axis. In this orientation, by properly controlling the engine speed and the relative orientation of the input axis with respect to the output axis of each apparatus independently, the platform can be moved in any desired manner.

Accordingly it is the principal objective of the present invention to provide a method for converting rotary motion to a rectilinear force.

It is a further object of the present invention to provide an apparatus for accomplishing this method.

It is a still further object of the present invention to provide such an apparatus which is of simplified construction for economical manufacture and which is of rugged design for long life.

The foregoing objectives, features and advantages of the present invention will be more readily understood upon consideration of the following detailed description of the invention taken in conjunction with the accompanying drawings.

DETAILED DESCRIPTION OF THE INVENTION

Figure 1:
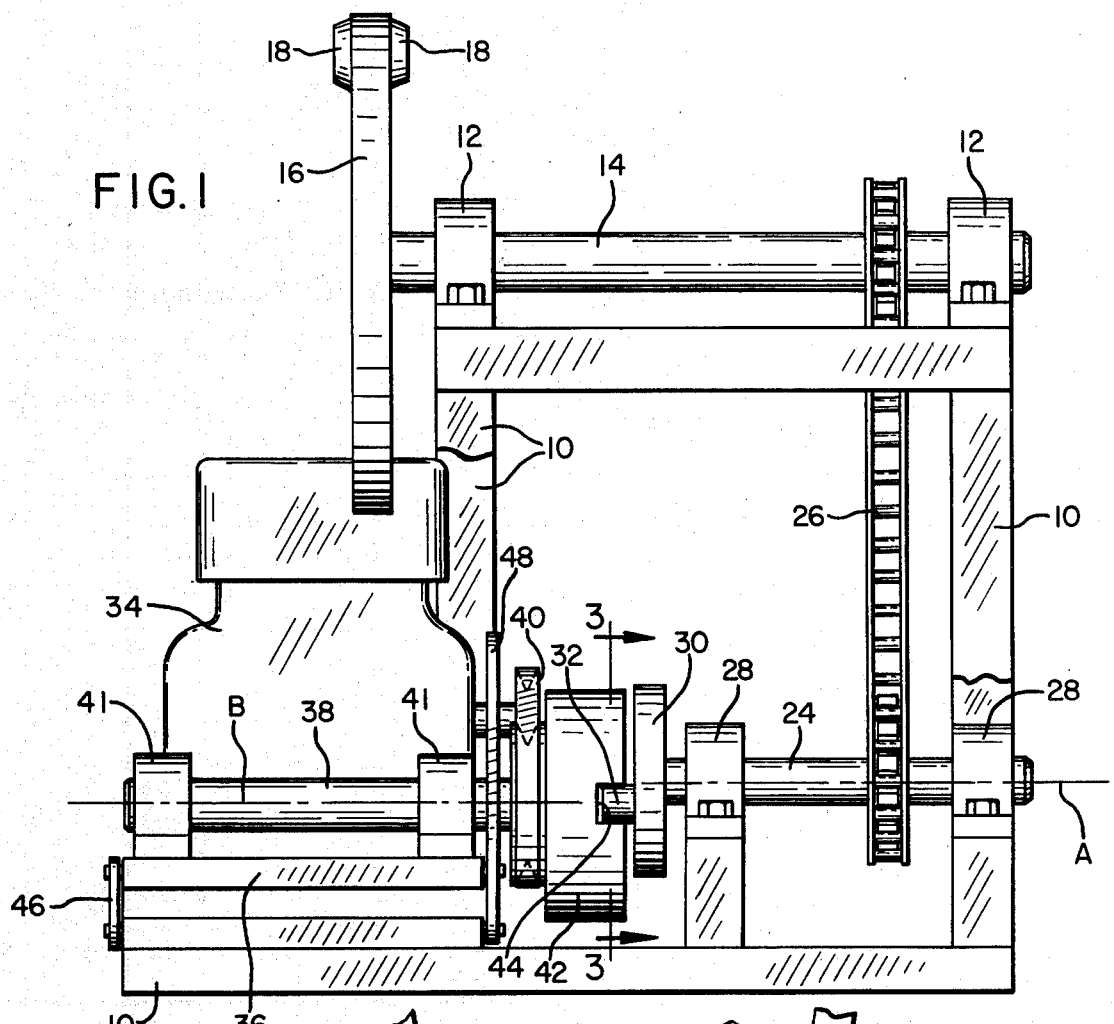
FIG. 1 is an end elevational view showing a preferred embodiment of the apparatus of the present invention.
Figure 2:
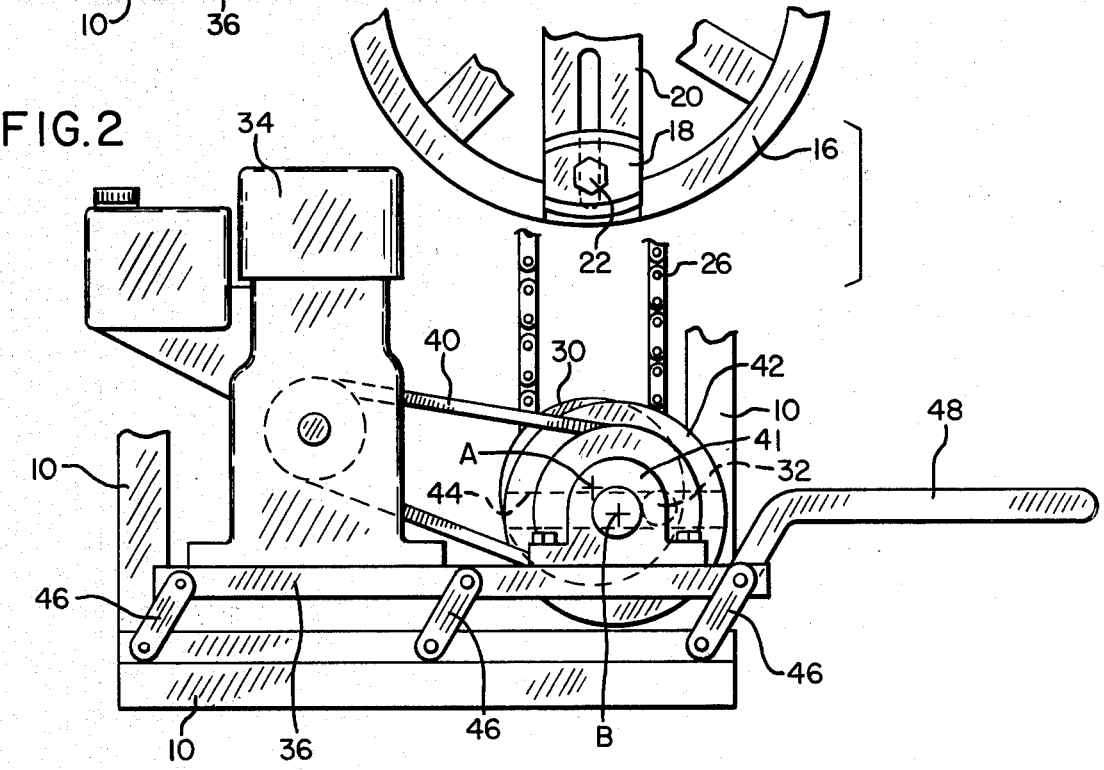
FIG. 2 is a fragmentary side elevational view of the apparatus of FIG. 1.

Referring to FIGS. 1 and 2 of the drawings, the apparatus of the present invention includes a frame 10 which supports the operative elements of the apparatus. Rotatably mounted on the frame, in bearings 12, is a shaft 14 which has a large flywheel 16 mounted on its extremity. The flywheel in turn mounts an eccentric weight 18 on its face with the weight being slidable radially in tracks 20 and attachable to the flywheel at any desired location by means such as bolt 22. However, if desired the manual means shown for positioning the weight can be replaced by automated means (not shown), thereby allowing the weight to be positioned while the flywheel is rotating.

Due to the size of the flywheel, shaft 14 is raised above the surface upon which frame 10 is positioned and is driven by an output shaft 24 through a chain drive 26. Shaft 24 is journaled in bearings 28 which are shown as being mounted on frame 10 below bearings 12. Mounted on the extremity of shaft 24 is a cam follower 30 which has an outwardly facing pin 32 located on it, parallel with but offset from its axis of rotation "A".

The flywheel is driven by drive means, such as motor 34, which is mounted to the frame by means of a platform 36. If desired, speed control means (not shown) can be included to control the rotational speed of the motor. The motor is connected to an input shaft 38 by means of a pulley drive 40. Shaft 38 is rotatable in bearings 41 about an input axis "B" which is parallel to and offset from output axis "A". Located at the extremity of shaft 38, adjacent to cam follower 30, is a cam element 42 which has a diametric slot 44 configured to slidably engage pin 32. The cam element and cam follower are arranged so that pin 32 remains in slot 44 when the cam members are rotated by motor 34 even though their respective axes are offset, which will occur when the length of slot 44 is at least twice as great as the distance between axes "A" and "B" plus the distance pin 32 is offset from axis "A".

Platform 36 which mounts motor 34 and bearings 41 is rotatably movable with respect to frame 10 by means of linkages 46 upon displacement of control arm 48. It should be noted, however, that the manual control means shown could be replaced by an automated system for remote rotation of platform 36. Accordingly, by rotating platform 36 the relative angular orientation of axis "A" with respect to axis "B" can be altered.

Figure 3:
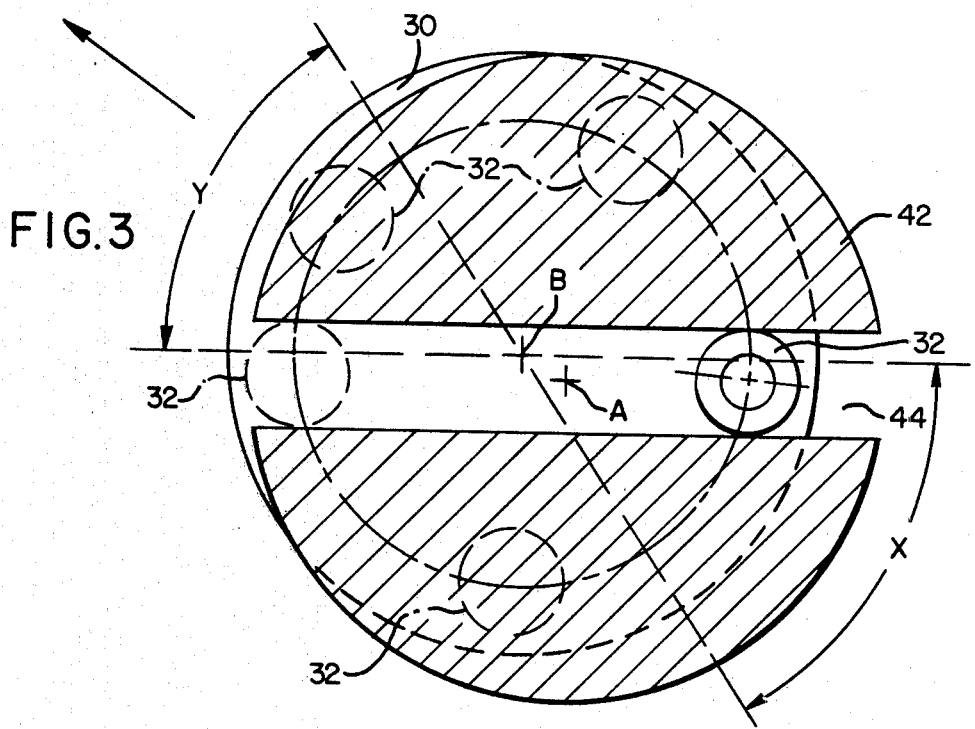
FIG. 3 is a sectional view, at an enlarged scale, taken along line 3—3 of FIG. 1.

When motor 34 is operated, shaft 38, and thus cam 42, is rotated at a constant speed. As cam element 42 rotates the interaction of pin 32 in slot 44 causes cam follower 30 to rotate also. However, since output axis "A", about which cam follower 30 rotates on shaft 24, is offset from input axis "B", upon which cam element 42 rotates on shaft 38, cam follower 30 and shaft 24 do not rotate at a constant rate of speed. Referring to FIG. 3, as cam follower 30 is rotated pin 32 moves radially inwardly and outwardly in slot 44 due to the offset of axes "A" and "B". Accordingly, its tangential speed is increased and decreased as it travels between portions of the cam element having respectively higher or lower surface speeds. Therefore the rotational speed of cam follower 30 varies cyclically during its rotation.

Figure 4:
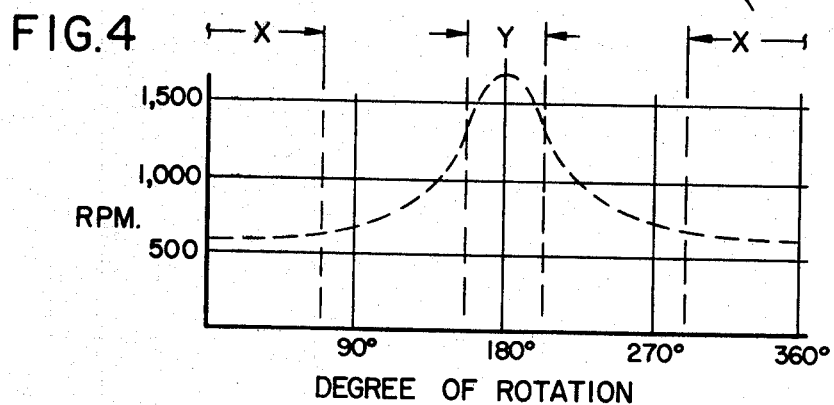
FIG. 4 is a graph showing operational characteristics of the invention.

This result is shown graphically in FIG. 4, where cam element 42 is illustrated as being rotated at a constant 1000 R.P.M. At that portion of the rotational cycle where pin 32 is located radially most inwardly in slot 44, angle X, the speed of cam follower 30 is slower than that of cam element 42, and at that portion of the rotational cycle where pin 32 is located radially most outwardly in slot 44, angle Y, the speed of cam follower 30 is faster than that of cam element 42.

Since an eccentrically unbalanced wheel imparts an unbalanced force to its supporting structure which is proportional to the amount of unbalance and the speed at which it is rotated, the unbalance force becomes biased in the present invention due to the variation of rotational speed imparted to flywheel 16 through chain drive 26. Accordingly the device is urged toward the direction of unbalance, which lies in that portion of the rotational cycle having the increased speed as shown by the arrow in FIG. 3.

Figure 5:
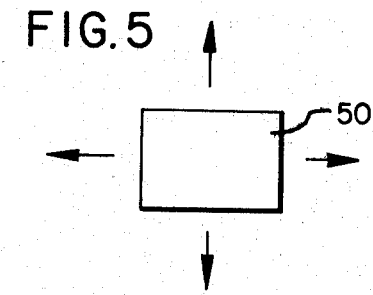
FIG. 5 is a diagrammatic view showing the operation of the invention.

In addition, by changing the relative angular displacement of axis "A" with respect to axis "B", the direction at which the unbalance is oriented can be changed. While the linkage shown only allows only 180° of axis displacement, a similar system having 360° of travel could be utilized if desired. Also, as noted, automated control means could be provided for this purpose. Accordingly as shown diagrammatically in FIG. 5, the force imparted to the apparatus can be oriented in any desired direction in the plane of flywheel rotation.

Further it will be noted that the magnitude of the unbalanced force thus created can be varied by either varying the speed of motor 34 or by varying the radial position of weight 18 on flywheel 16. Accordingly by providing automated controls for these functions in addition to controlling the aforementioned angular relationship, the device can be controlled to any degree desired.

Figure 6:
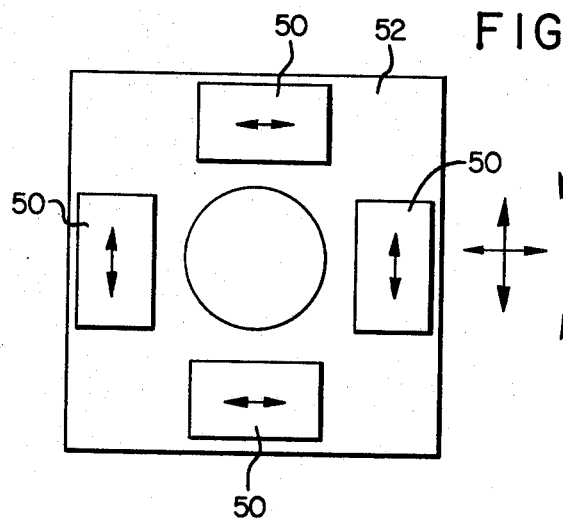
FIG. 6 is a diagrammatic view showing the operation of another embodiment of the invention employing multiple apparatus.

Referring to FIG. 6, four of the apparatus 50 are shown mounted on a platform 52 with two of them being oriented so that their flywheels rotate in opposite directions about a first axis and two of them being oriented so that their flywheels rotate in opposite directions about a second axis which is perpendicular to and coplaner with the first axis. In this orientation by properly controlling engine speed, weight location and the relative orientations of axis "A" with respect to axis "B", the platform can be moved in any desired direction, either linearly or rotationally, at any speed within the power capabilities of the motors. Thus an operational platform having complete navigational freedom is provided.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for converting rotary motion to a rectilinear force, comprising:
   (a) drive means for providing a rotary power output having a constant rotational speed;
   (b) an eccentrically unbalanced flywheel arranged for being rotatingly driven by said drive means;
   (c) cam mechanism means, interconnecting said drive means and said flywheel, for rotating said flywheel such that for each rotation of said drive means said flywheel first makes a portion of a revolution at a rotational speed which is greater than said constant rotational speed and then completes said revolution at an average rotational speed which is less then said constant rotational speed; and
   (d) alignment means associated with said cam mechanism means, for varying the angular position of said flywheel at which said portion of a revolution, at a rotational speed which is greater than said constant rotational speed, begins.

2. The apparatus of claim 1 wherein said cam mechanism means comprises:
   (a) a cam element, connected to said drive means, and rotatable thereby about an input axis;
   (b) said cam element having a planar face oriented perpendicular to said input axis, and having an elongate slot extending diametrically across said face;
   (c) a cam follower connected to said flywheel, said cam follower being rotatable about an output axis which is parallel with but offset from said input axis;
   (d) a pin, configured for sliding fit within said slot, located on said cam follower and extending therefrom parallel with but offset from said output axis:
   (e) said cam element and cam follower being arranged with respect to one another with said pin being in engagement with said slot and remaining in such engagement during rotation; and
   (f) said alignment means including means for moving said input axis relative to said output axis in a nonradial direction with respect to said output axis.

3. The apparatus of claim 2 wherein said slot has a longitudinal extent which is at least twice as great as the amount of offset between said input axis and said output axis plus the amount of offset between said pin and said output axis.

4. The apparatus of claim 2 wherein said cam element and said cam follower are mounted on separate platforms, and said alignment means comprises a linkage arranged for moving one of said platforms with respect to the other of said platforms in a manner to change the angular position of said input axis with respect to said output axis.

5. The apparatus of claim 4 including control means associated with said linkage for selectively arranging the angular position of said axes.

6. A platform having at least four of the apparatus of claim 1 mounted thereon, said apparatus being oriented so that at least two have their respective flywheels rotating in opposite directions about a first axis of said platform, and at least two have their respective flywheels rotating in opposite directions about a second axis of said platform, said first and second axes being perpendicular to and coplanar with each other.

7. The apparatus of claim 1 including speed control means associated with said drive means for selectively varying the rotational speed thereof.

8. The apparatus of claim 1 including a weight slidably mounted on said flywheel so as to cause its eccentricity.

9. The apparatus of claim 8 including locating means for selectively positioning said weight on said flywheel so as to control the amount of its eccentricity.

* * * * *